United States Patent   [11] 3,591,810

[72] Inventor Geoffrey Jackson
           Harpenden, England
[21] Appl. No. 816,261
[22] Filed Apr. 15, 1969
[45] Patented July 6, 1971
[73] Assignee Hawker Siddeley Dynamics Limted
           Hatfield, England
[32] Priority Apr. 18, 1968
[33]        Great Britain
[31]        18429/68

[54] TEMPERATURE MONITORING APPARATUS USING A PHOTOCHROMIC HEAT SENSOR
8 Claims, 4 Drawing Figs.

[52] U.S. Cl. .................................................. 250/83,
           73/356, 250/83.3, 350/160
[51] Int. Cl. ............................................... G01t 1/16
[50] Field of Search .................................. 250/83, 83
       CD, 83.3, 86, 229; 350/160 P; 73/356, 355 Inquired;
                                 106/47; 356/43 Inquired

[56]            References Cited
              UNITED STATES PATENTS
2,792,484  5/1957  Gurewitsch et al. .......... 350/160 UX
2,824,235  2/1958  Hahn, Jr. et al. .............. 250/83.3
2,945,954  7/1960  Gaugler ......................... 250/83 X
3,134,019  5/1964  Bishay ........................... 250/83
3,327,120  6/1967  Weiss ............................ 250/83.3

Primary Examiner—James W. Lawrence
Assistant Examiner—Davis L. Willis
Attorney—Dowell and Dowell ABSTRACT: A temperature sensor is described in which the temperature-responsive element is a photochromic compound. This compound, in film form, is irradiated by activating and monitoring radiation of appropriate wavelengths. The activating radiation induces a change in the extent to which the monitoring radiation is transmitted by the photochromic compound. The amount of this change is temperature-dependent, thereby giving the required temperature responsiveness.

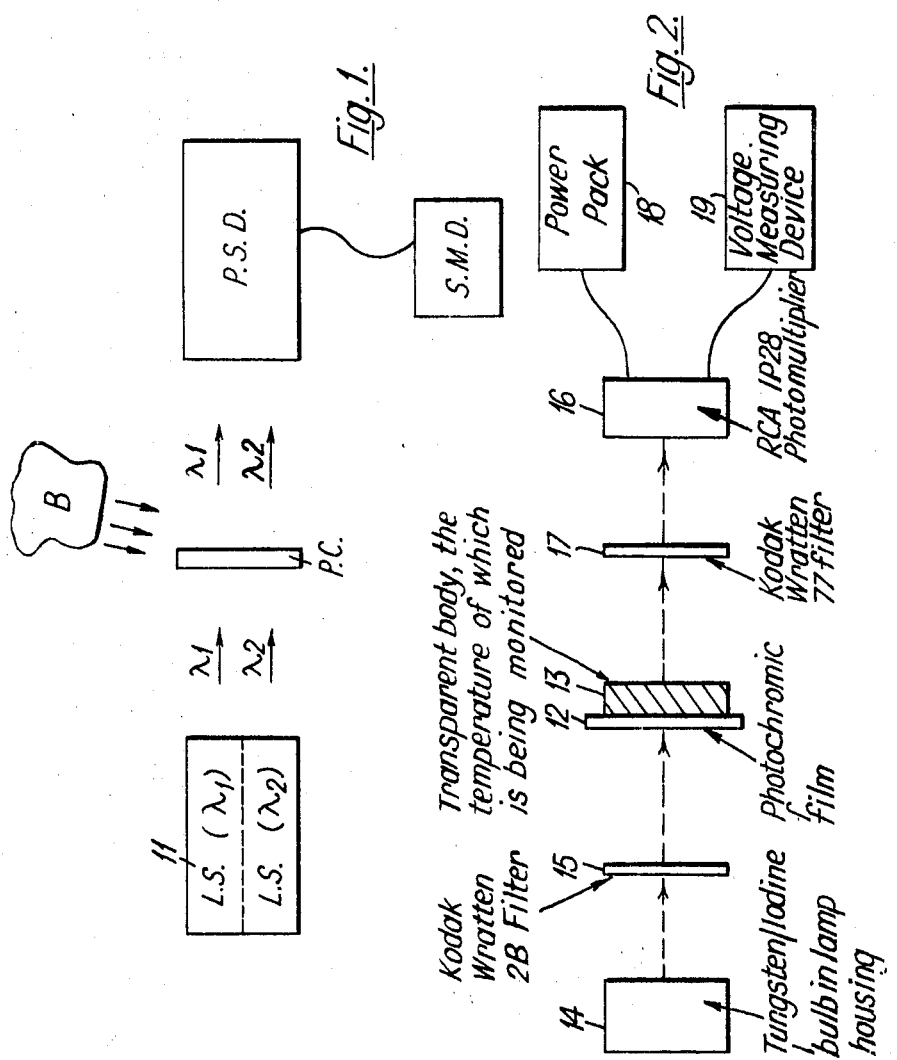

Transmission v Temperature for a photographic film using 3 lamp voltages

TEMPERATURE MONITORING APPARATUS USING A PHOTOCHROMIC HEAT SENSOR

This invention relates to optical devices which can be used to monitor temperature changes in a system.

According to the invention, there is provided an optical device to monitor temperature changes, in which the temperature sensor comprises a photochromic material. The intensity of the color of the photochromic component of the device depends not only on the intensity of light falling on it, but varies as a function of the temperature to be measured.

An advantage is that the temperature range over which the device shows its optimum sensitivity is variable within limits.

A further advantage is that whereas devices for monitoring temperature commonly require material connections between the point to be monitored and the readout of the device (e.g. thermocouples require electrical leads) the device according to this invention requires only a usable optical path. It is thus convenient for monitoring the temperature not only of readily accessible bodies, but also of inaccessible or moving components.

A photochromic material reversibly changes its color (i.e. its absorption spectrum) on absorption of light of ultra violet or visible wavelengths - the "activation reaction". This color change may be reversed on absorbing light corresponding to the absorption spectrum of the activated form - the "photoreverse reaction," or thermally by the application of heat - the "thermal reverse reaction." The activation reaction may give rise to a change from a colorless to a colored form, from colored to colorless, or from one color to another.

The rate of the thermal reverse reaction varies widely from one material to another to room temperature; thus in the dark the activated form may have a lifetime which varies from less than a second to several months. The rate constant $k$ for the thermal reverse reaction varies with temperature, often according to an equation of the form $$k = k_0 e - \frac{E}{RT}$$

where $T$ corresponds to the absolute temperature. As the temperature increases the lifetime of the activated form in the dark decreases.

The activation reaction is always opposed by the thermal reverse reaction and for any given activating intensity a dynamic equilibrium is reached when the rate of activation equals the rate of reversal.

The form of the device according to this invention depends on whether the photochromic change is monitored at a wavelength $\lambda_2$ differing from the activation wavelength $\lambda_1$, or is activated and monitored at the same wavelength $\lambda_1$.

The nature of the invention will now be discussed in more detail with reference to the accompanying diagrammatic drawings, in which:

FIG. 1 is a diagram to illustrate the principle of the invention,

FIG. 2 shows a more specific embodiment of the invention,

Figure 3:
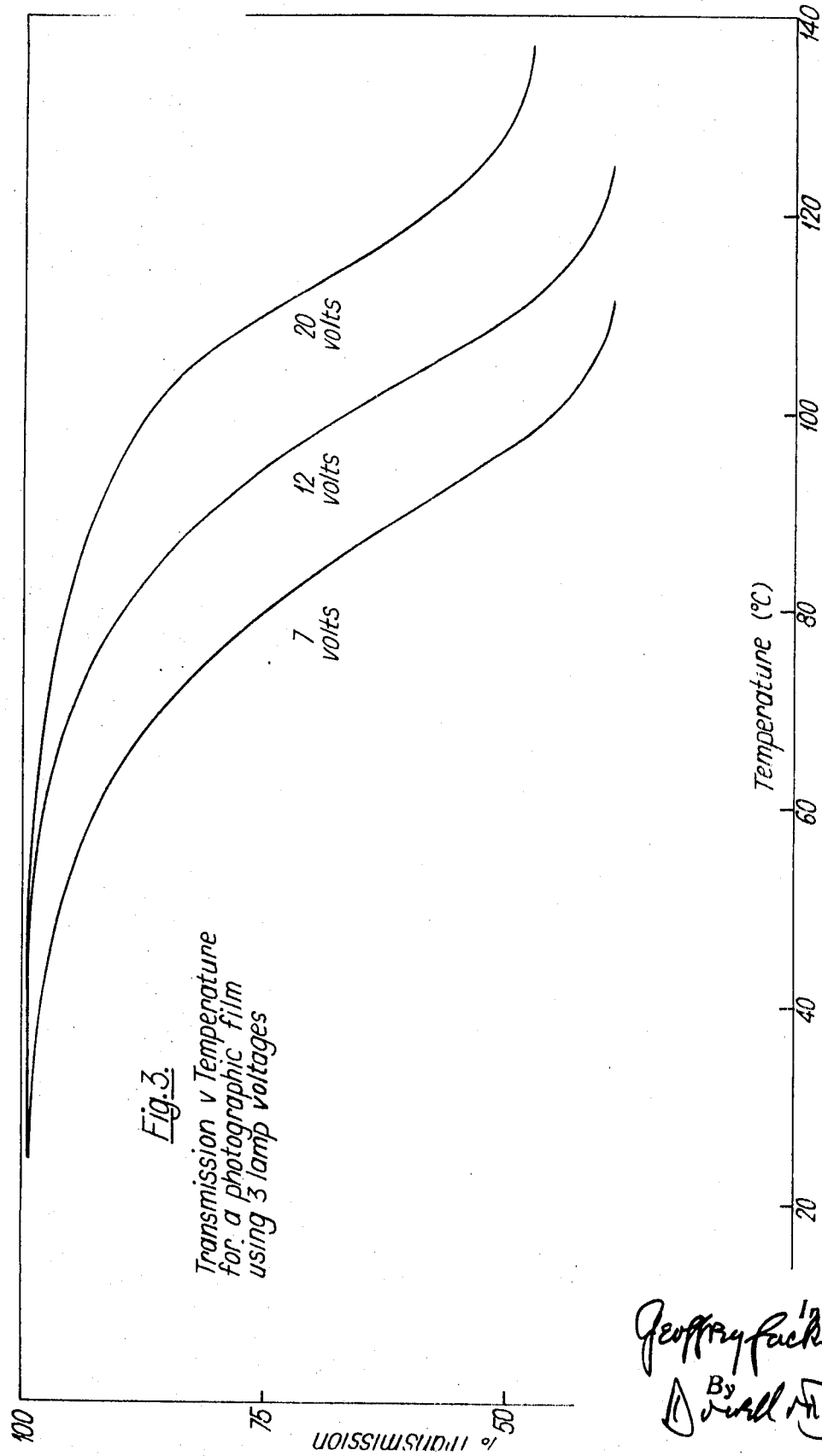
FIG. 3 is a graphical presentation of curves characteristic of the operation of the apparatus of FIG. 2.

Referring firstly to FIG. 1, a device according to the invention consists basically of the following components: 1. A light source L.S. ($\lambda_1$) of wavelength $\lambda_1$, appropriate for activating the photochromic film, and a light source L.S. ($\lambda_2$) for monitoring the transmission of the photochromic material at wavelength $\lambda_2$. A single source 11 emitting both wavelengths may be used; or the same wavelength may be employed for both activation and monitoring. 2. A photochromic material P.C. in the form of a film or plate which is in a position to sense the temperature of the body B. 3. A photosensitive device P.S.D. (e.g. a photocell, photomultiplier, etc.) for measuring the light of wavelength $\lambda_1$ or $\lambda_2$ transmitted by the photochromic film P.C., connected to 4. A signal measuring device S.M.D. (e.g. a voltage recorder).

The method of operation of the device is as follows:

*a* With different activating and monitoring wavelengths $\lambda_1$ and $\lambda_2$.

The source L.S. ($\lambda_1$) is directed on to the photochromic material P.C. with a constant intensity which is sufficient to change its transmission at wavelength $\lambda_2$ by a required amount. Thus transmission is seen by the detector P.S.D. As the temperature of the body B being monitored rises, i.e. the temperature of the photochromic material P.C. rises, the change in transmission induced by radiation L.S. ($\lambda_1$) is reduced due to the increased rate of reversal of the photochromic material P.C. to its original unactivated form. Thus the signal from the detector P.S.D. varies as a function of the temperature of photochromic material P.C.

By changing the intensity of wavelength $\lambda_1$ a given transmission value of wavelength $\lambda_2$ can be made to correspond to different temperatures, i.e. a variety of response curves of the output from the detector P.S.D. plotted against temperature of the body B are possible by changing the intensity of transmission of the activating wavelength $\lambda_1$.

*b* With a single activating and monitoring wavelength $\lambda_1$.

The method of operation is similar to the first described under (a) above, but now the monitoring wavelength becomes also $\lambda_1$ and it is unnecessary to provide either two light sources (or one containing the two wavelength bands), the detector P.S.D. measuring light incident as $\lambda_1$.

Variations on the simple scheme above may be introduced for the purpose of i. directing or focusing the activating light on to the photochromic film, e.g. by means of a lens or mirror system.

ii. filtering wavelengths from the activating and monitoring lights which are not necessary for activation or monitoring and detrimental to the performance of the photochromic film.

iii. establishing thermal contact between the photochromic material and the body whose temperature is to be monitored.

The photochromic film or plate may for example be situated in such a position that the monitoring light can be transmitted by the film to the photosensitive device, as shown in the drawing, or the film may be given a reflecting surface on its back face, the monitoring light then being reflected to the photosensitive device.

The photochromic material in either form may be situated in a position where it receives heat from the body, whose temperature is to be monitored, by conduction, convection or radiation, or a combination of these. Radiated energy may be focused by a separate optical arrangement.

Further variants include:

iv. removing light of the activating wavelength from that incident on the photosensitive device.

v. limiting the amount of light falling on to the photosensitive device.

vi. making use of the signal from the photosensitive device instead of merely measuring it, e.g. the output may be connected to a relay which trips at a preset signal value. The complete device can then be used, for instance, to indicate when the temperature of the body being monitored rises above a specific level.

A more specific example of the type of operation described under (b) above will now be given with reference to FIGS. 2 and 3.

The photochromic sample consists of a film of cellulose triacetate polymer with the photochromic compound homogeneously dissolved in it. The photochromic compound is 6′8′ dinitro 1,3,3 trimethyl-spiro- (2′H 1′ benzopyran -2′, 2-indoline) for which the formula approximates to I:

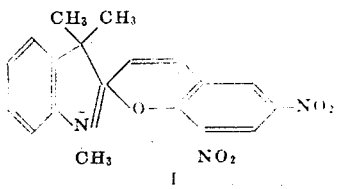

I

This compound is stable in the dark as a colored species with a long wave absorption maximum 5360A. in cellulose triacetate. Sufficient compound is incorporated in the film to give an initial transmission at 5360A. of <40 percent.

The colored film may be bleached to almost completely transparent provided a sufficient intensity of wavelengths falling within the visible absorption band of the spiropyran are used. However, as the temperature of the film rises, the rate of reformation of the colored form increases. By a suitable choice of the initial bleaching intensity and wavelength, the decrease (or increase for a temperature drop) in visible transmission can be chosen to occur over a selected limited temperature range.

In FIG. 2, the photochromic film 12 has placed contiguously behind it a transparent body 13 of which the temperature is to be monitored. Light from a lamp 14 having a tungsten/iodine bulb arrives at the film 12 via a filter 15; and the portion of this light transmitted through the film 12 and body 13 reaches an electrical photomultiplier 16 via a second filter 17. The photomultiplier receives an electrical supply from a power pack 18 and delivers to a voltage measuring device 19 an output voltage representative of the amount of light falling on the photomultiplier.

Using the arrangement of FIG. 2, transmission versus temperature curves similar to those shown in FIG. 3 are obtained. It can be seen that:

i. by varying the incident lamp voltage (i.e. its intensity) a chosen transmission can be made to correspond to different temperatures of the photochromic film (horizontal lines on the figure);

ii. a given temperature can correspond to different transmissions of the film, depending on the lamp voltage (vertical lines on the figure).

Figure 4:
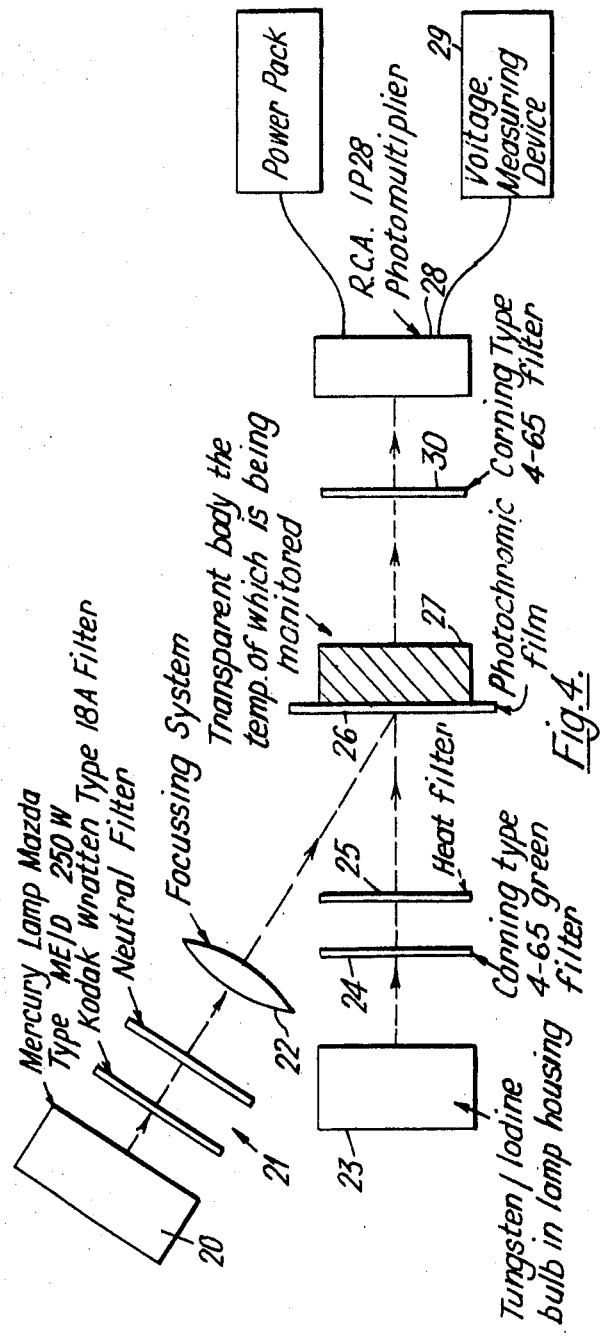
FIG. 4 is a diagram of a further embodiment.

An example of the type of operation described under (a) above will now be described with reference to FIG. 4.

The photochromic film in this case consists of a polymer film of cellulose triacetate containing 6'-nitro-1,3,3-trimethyl-spiro-(2'H 1' benzopyran-2', 2-indoline) of formula II.

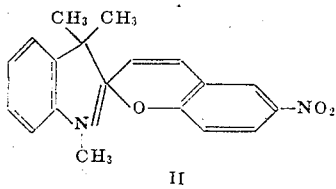

II

The film is originally virtually colorless, but on irradiation with wavelengths < 4000A. becomes magneta in color due to the formation of a species with maximum absorption in the visible range at ~5650A. Sufficient spiropyran is added during the preparation of the film to allow for development of a transmission of 10 percent or less at 5650A. on irradiation with a high intensity of ultrasonic light (e.g. a 1 percent by weight solution).

The activation lamp 20 consists of a medium pressure mercury lamp from which the 3660A. line is separated for use by filters 21. The intensity of the beam from this lamp 20 is adjusted using a lens focusing system 22 and/or neutral density filters until the temperature range of interest causes a sufficient change in the transmission to be adequately monitored. The monitoring system consists of a tungsten iodine bulb 23 shining through a green filter 24 and heat filter 25 and then through the photochromic film 26, the transparent body 27 whose temperature is to be monitored, and a further filter 30 on to a photocell or photomultiplier 28. For a given ultra violet intensity incident on the film 26, the transmission of the photochromic film is a direct function of its temperature. As the temperature of the film rises, the rate of bleaching increases, i.e. the transmission rises, and the photocell or photomultiplier output to the measuring device 29 increases.

When a polymer is used for the matrix for the photochromic film, one which is resistant to the highest temperature of operation must be chosen. When softening without degradation of the film occurs at the highest temperatures, the film may be supported either at the edges or between thin transparent plates.

A cellulose triacetate film of either of the spiropyran compounds given in the preceding examples may be prepared as follows: Dissolve cellulose triacetate in chloroform (say 5g. to 100ml. solvent), add a solution of the spiropyran in chloroform (say 0.05g. in a minimum volume of solvent) and pour sufficient into an open Petri dish to leave a film of the required thickness (and transmission) on drying. Drying is best performed in a sheltered position to allow only slow removal of solvent vapor.

The particular organic photochromic materials cited in the examples are subject to fatigue which prevents their continuous long term use. However, other photochromic materials are available with better fatigue properties, e.g. inorganic materials such a Corning photochromic glasses and synthetic sodalites (which would both be used in a type (a) mode.)

I claim:

1. An optical device to monitor temperature changes, comprising a photochromic sensor material situated in a position to partake of the temperature of a body whose temperature is to be monitored, source means emitting activating and monitoring radiation which radiation falls upon the photochromic sensor, a photosensitve detector responsive to the monitoring radiation and situated to give an output dependent upon the amount of monitoring radiation that emerges from the photochromic sensor, and a signal-level-responsive device receiving the output of the photosensitive detector.

2. A device according to claim 1, further comprising optical filter means disposed between the source and the photochromic sensor.

3. A device according to claim 1 wherein the activating and monitoring radiation is of the same wavelength.

4. A device according to claim 1, wherein the monitoring radiation is of a wavelength different from the activating radiation.

5. A device according to claim 4, wherein the intensity of the activating radiation is variable, without variation in the intensity of the monitoring radiation.

6. A device according to claim 1 wherein the photochromic sensor has a reflecting backing and the photosensitive detector receives radiation reflected thereby.

7. A device according to claim 1, further comprising an optical system for directing the source radiation on the photochromic sensor.

8. A device according to claim 1, further comprising optical filter means disposed between the photochromic sensor and the photosensitive detector.